US012338673B2

(12) United States Patent
Fang

(10) Patent No.: US 12,338,673 B2
(45) Date of Patent: Jun. 24, 2025

(54) TRANSMISSION MECHANISM AND CASING ASSEMBLY INCLUDING THE SAME

(71) Applicant: WISTRON CORP., New Taipei (TW)

(72) Inventor: Tzu Hao Fang, New Taipei (TW)

(73) Assignee: WISTRON CORP., New Taipei (TW)

( * ) Notice: Subject to any disclaimer, the term of this patent is extended or adjusted under 35 U.S.C. 154(b) by 113 days.

(21) Appl. No.: 18/187,774

(22) Filed: Mar. 22, 2023

(65) Prior Publication Data

US 2024/0141713 A1 May 2, 2024

(30) Foreign Application Priority Data

Oct. 28, 2022 (TW) ................................ 111141043

(51) Int. Cl.

*E05F 15/70* (2015.01)
*A47B 46/00* (2006.01)
*A47B 87/02* (2006.01)
*E05F 15/614* (2015.01)

(52) U.S. Cl.

CPC .............. *E05F 15/70* (2015.01); *A47B 46/00* (2013.01); *A47B 87/0284* (2013.01); *E05F 15/614* (2015.01); *E05Y 2201/462* (2013.01); *E05Y 2900/20* (2013.01)

(58) Field of Classification Search

CPC ....... E05F 15/614; E05F 15/70; E05F 15/603; E05Y 2201/462; E05Y 2900/20; A47B 46/00; A47B 87/0284

USPC ........................................... 49/333–335, 337

See application file for complete search history.

(56) References Cited

U.S. PATENT DOCUMENTS 3,919,890 A * 11/1975 Workman ............. E05F 1/1207 74/56
4,121,382 A * 10/1978 Dietrich ................ E05F 15/614 49/337
4,970,825 A * 11/1990 Knarvik .................. E05D 15/02 49/44
5,688,019 A * 11/1997 Townsend ............. B60R 21/207 296/146.4
5,826,377 A * 10/1998 Simson ............... E05D 15/0656 49/362
2010/0242366 A1* 9/2010 Liebscher ............. E05F 15/643 49/142

(Continued)

FOREIGN PATENT DOCUMENTS

CN 110145199 A * 8/2019
CN 112502560 A * 3/2021 ............. E05D 11/00

(Continued)

*Primary Examiner* — Hiwot E Tefera

(74) *Attorney, Agent, or Firm* — McClure, Qualey & Rodack, LLP

(57) ABSTRACT

A transmission mechanism for a driven component which has a first through hole includes an actuating component rotatably disposed through the first through hole of the driven component, a transmission component located in the first through hole of the driven component, and an electromagnet located in the first through hole of the driven component and arranged at a side of the transmission component, the transmission component is selectively attracted to the electromagnet, the driven component is rotatable by the actuating component via the transmission component when the transmission component is attracted to the electromagnet.

20 Claims, 10 Drawing Sheets

(56) References Cited

U.S. PATENT DOCUMENTS

| | | | | |
|---|---|---|---|---|
| 2010/0295542 | A1* | 11/2010 | Pellegrini | E05F 15/603 324/207.25 |
| 2017/0143145 | A1* | 5/2017 | Peynet | G06Q 10/0836 |
| 2019/0093410 | A1* | 3/2019 | Yao | F25D 23/028 |
| 2021/0340802 | A1* | 11/2021 | Wu | E05F 1/00 |
| 2022/0298844 | A1* | 9/2022 | Huff | G07C 9/22 |

FOREIGN PATENT DOCUMENTS

| | | | | | |
|---|---|---|---|---|---|
| CN | 113017279 | A | | 6/2021 | |
| CN | 113323561 | A | * | 8/2021 | |
| CN | 113550684 | A | * | 10/2021 | |
| CN | 114463900 | A | | 5/2022 | |
| DE | 202006014936 | U1 | * | 3/2008 | B61D 19/023 |
| KR | 200307825 | | * | 3/2003 | |
| SE | 2150914 | A1 | * | 1/2023 | |

* cited by examiner

TRANSMISSION MECHANISM AND CASING ASSEMBLY INCLUDING THE SAME

CROSS-REFERENCE TO RELATED APPLICATIONS

This non-provisional application claims priority under 35 U.S.C. § 119(a) on Patent Application No(s). 111141043 filed in Taiwan (R.O.C.) on Oct. 28, 2022, the entire contents of which are hereby incorporated by reference.

TECHNICAL FIELD

The disclosure relates to a transmission arrangement, more particularly relates to a transmission mechanism and a casing assembly including the same.

BACKGROUND

Lockers may be a drawer or compartment commonly found in various public places such as locker rooms, workplaces, elementary schools, schools, transport hubs and the like. They may vary in size, purpose, construction, and security.

Generally, lockers are in dedicated cabinets and very often in large numbers. The cabinets may have a plurality of independent accommodation spaces and respective doors for closing the accommodation spaces. Typically, the doors are connected to the cabinet via hinges so that opening and closing the lockers still relay on manual. This often causes inconvenience when taking or placing the personal possessions.

SUMMARY

Accordingly, one aspect of the disclosure is to provide a transmission mechanism and a casing assembly which are suitable to be incorporated with automatic control technique to improve convenience in operation.

One embodiment of the disclosure provides a transmission mechanism for a driven component which has a first through hole including an actuating component rotatably disposed through the first through hole of the driven component, a transmission component located in the first through hole of the driven component, and an electromagnet located in the first through hole of the driven component and arranged at a side of the transmission component, the transmission component is selectively attracted to the electromagnet, the driven component is rotatable by the actuating component via the transmission component when the transmission component is attracted to the electromagnet.

One embodiment of the disclosure provides a casing assembly including a casing, a transmission mechanism disposed on the casing, and a driven component disposed on the casing and having a first through hole, the transmission mechanism includes an actuating component rotatably disposed through the first through hole of the driven component, a transmission component located in the first through hole of the driven component, and an electromagnet located in the first through hole of the driven component and arranged at a side of the transmission component, the transmission component being selectively attracted to the electromagnet, the driven component is rotatable by the actuating component via the transmission component when the transmission component is attracted to the electromagnet.

One embodiment of the disclosure provides a casing assembly including a casing, a transmission mechanism disposed on the casing, and a plurality of driven components disposed on the casing via the transmission mechanism, the transmission mechanism including an actuating component rotatably disposed through the first through holes of the plurality of driven components, a plurality of transmission components respectively located in the first through holes of the plurality of driven components, a driving unit, and a plurality of electromagnets respectively located in the first through holes of the plurality of driven components and respectively arranged at sides of the plurality of transmission components, the plurality of driven components each has a first through hole, the actuating component is rotated via the driving unit, the actuating component is disposed through the plurality of transmission components, the plurality of transmission components are selectively attracted to the plurality of electromagnets, respectively, at least one of the plurality of driven components is rotatable by the actuating component via at least one of the plurality of transmission components when the at least one of the plurality of transmission components is attracted to at least one of the plurality of electromagnets.

According to the transmission mechanism and casing assembly as discussed in the above embodiments of the disclosure, the transmission component is selectively attracted to the electromagnet, thus the actuating component being disposed through the transmission component is able to move the driven component via the transmission component. Such an arrangement makes the transmission mechanism possible to be incorporated with automatic control system and thereby allowing user to selectively instruct the actuating component to move any selected driven component, realizing automatic operation of driven component and improving convenience in operating the driven component.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms “mounted,” “connected,” and variations thereof are used broadly and encompass both direct and indirect mountings and connections. As used herein, the terms “substantially” or “approximately” may describe a slight deviation from a target value, in particular a deviation within the production accuracy and/or within the necessary accuracy, so that an effect as present with the target value is maintained. Unless specified or limited otherwise, the phrase “at least one” as used herein may mean that the quantity of the described element or component is one or more than one but does not necessarily mean that the quantity is only one. The term “and/or” may be used herein to indicate that either or both of two stated possibilities.

Figure 1A:
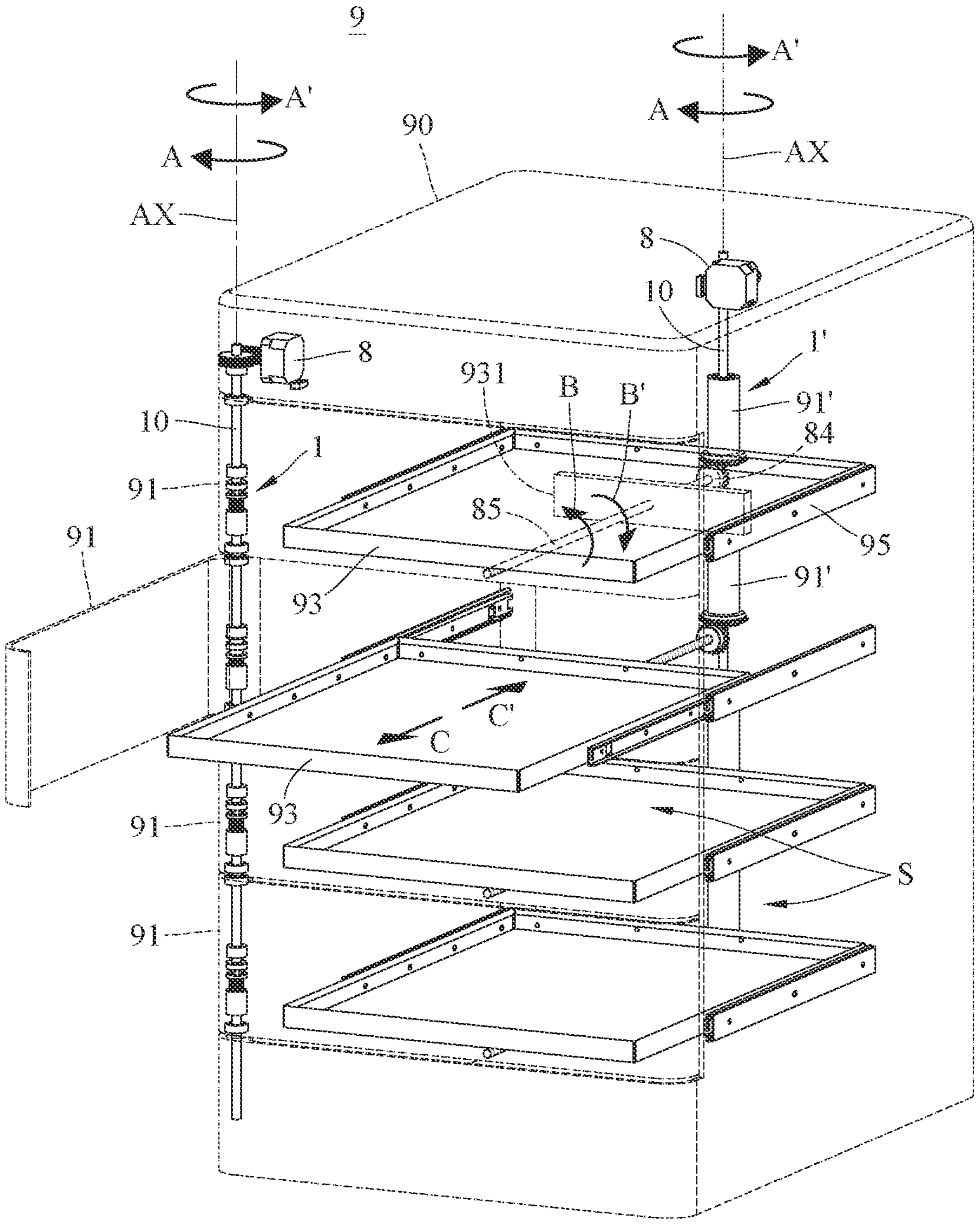
FIGS. 1A-1B are perspective views of a casing assembly according to one embodiment of the disclosure.
Figure 1B:
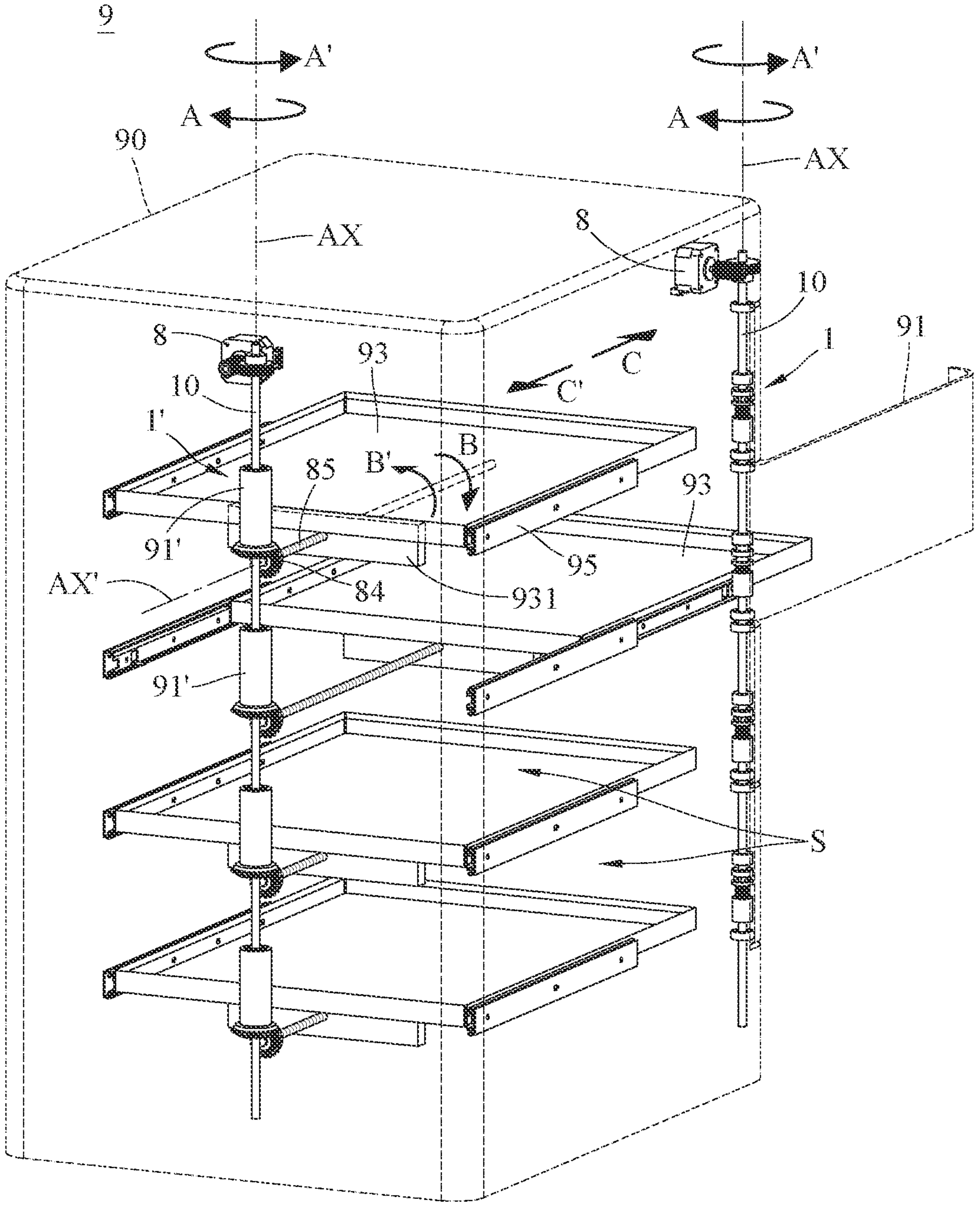

Firstly, referring to FIGS. 1A-1B, one embodiment of the disclosure provides a casing assembly 9. The casing assembly 9 is configured for providing one or more compartments or secure storage spaces for storing objects (not shown). Thus, the casing assembly 9 may be employed as a locker for public use or parcel locker as required. Note that the casing assembly 9 may be sized and shaped as required.

In this embodiment, the casing assembly 9 may include a casing 90, at least one driven component 91 disposed on the casing 90, a transmission mechanism 1, at least one supporting component 93, at least one driven component 91', and a transmission mechanism 1', where the transmission mechanism 1 is able to selectively move at least one of the driven components 91, and the transmission mechanism 1' is able to selectively move at least one of the supporting components 93 by driving the respective driven component 91'.

The driven component 91 may be rotatably disposed on the casing 90 via the transmission mechanism 1. As shown, the driven component 91 is rotatable about an axis AX relative to the casing 90. The driven component 91 may be in plate shape and therefore may be served as a door for the casing assembly 9. Further, the transmission mechanism 1 may be able to selectively make at least one of the driven components 91 rotate relative to the casing 90 (as the opposite directions indicated by arrows A and A'). As such, the transmission mechanism 1 is able to close or open the selected driven component 91 relative to the casing 90.

The supporting components 93 are slidably disposed in the casing 90 via rails 95. The supporting components 93 and the casing 90 may together define a plurality of accommodation spaces S which respectively correspond to the driven components 91. The supporting component 93 may be in plate shape and may be served to support the object (not shown) stored in the casing assembly 9. The transmission mechanism 1' is disposed on the casing 90. The driven component 91' may be rotatably disposed on the casing 90 via the transmission mechanism 1'. As shown, the driven component 91' is rotatable about the axis AX relative to the casing 90.

Further, each of the supporting components 93 may be connected to the driven component 91' via a transmission rod 85 and a transmission gear 84. As shown, the transmission rod 85 may be a screw rod being disposed on the casing 90 and rotatable about an axis AX'. The transmission rod 85 is meshed with a connection structure 931 of the supporting component 93. The axis AX' may be at an angle (e.g., 90 degrees) to the aforementioned axis AX. Transmission gear 84 may be a bevel gear being disposed on the transmission rod 85 and meshed with the driven component 91'; in other words, the transmission rod 85 is connected to the driven component 91' via the transmission gear 84. The transmission mechanism 1' may selectively cause at least one of the driven components 91' to rotate in direction indicated by arrow A or opposite direction indicated by arrow A', thereby causing the transmission gear 84 and the transmission rod 85 which are connected thereto to rotate in direction indicated by arrow B or opposite direction indicated by arrow B'. As such, the transmissions mechanism 1' is able to make one or more selected supporting component 93 slide in direction indicated by arrow C to protrude from the casing 90 or opposite direction indicated by arrow C to be stored within the casing 90.

The transmission mechanism 1 and the transmission mechanism 1' are able to be cooperated with each other. For example, according to instruction, the transmission mechanism 1 may open one or more selected driven components 91 relative to the casing 90 and meanwhile the transmission mechanism 1' may cause the respective supporting components 93 slide outward accordingly. For example, according to instruction, the transmission mechanism 1' may cause the one or more selected supporting components 93 slide inward and meanwhile the transmission mechanism 1 may close the respective driven components 91 to cover the respective accommodation spaces S.

Figure 2:
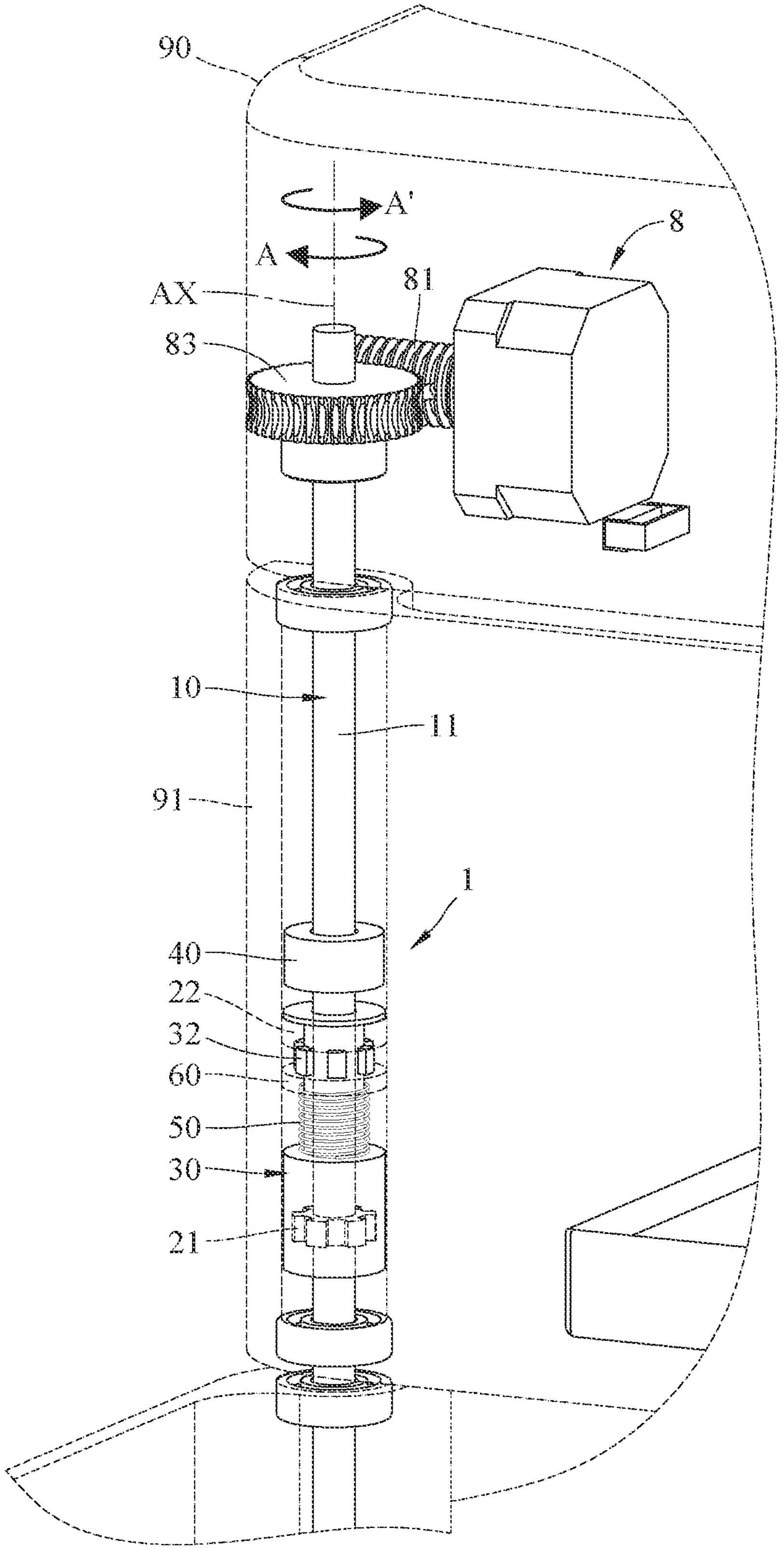
FIG. 2 is a partially-enlarged view of FIG. 1.
Figure 3:
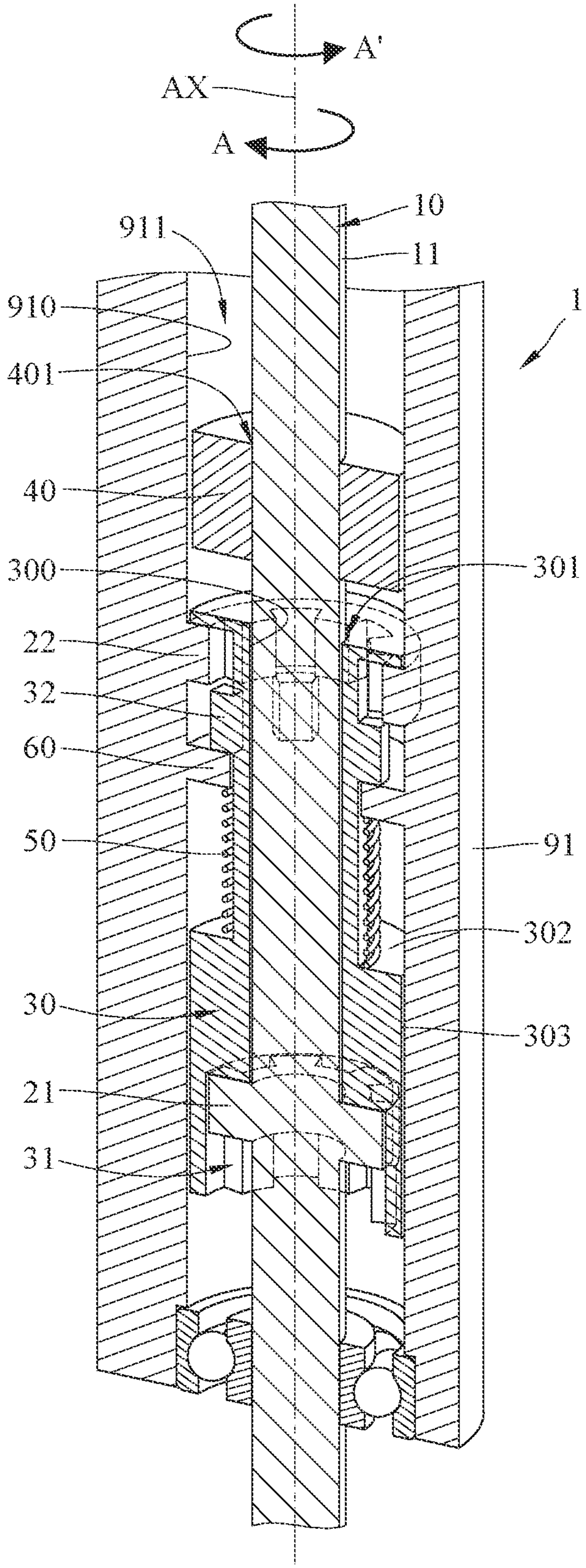
FIG. 3 is a partially-enlarged cross-sectional view of FIG. 2.
Figure 4:
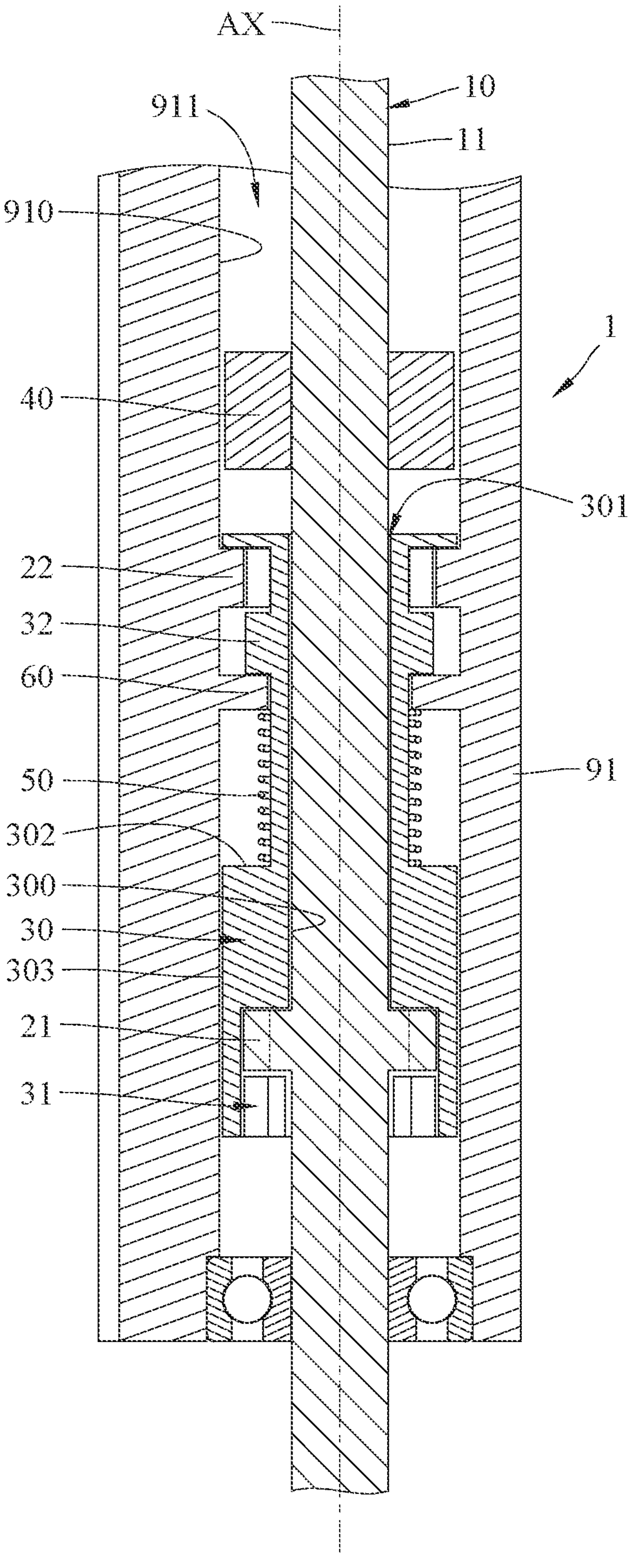
FIG. 4 is a partially-enlarged cross-sectional side view showing that a transmission component of a transmission mechanism is in a releasing position.

The detail of the transmission mechanism 1 and the transmission mechanism 1' are given below. Firstly, please refer to FIGS. 2-4 to describe the transmission mechanism 1, where FIG. 2 is a partially-enlarged view of the transmission mechanism 1 in casing assembly 9, FIG. 3 is a partially-enlarged cross-sectional view of the transmission mechanism 1 in casing assembly 9, and FIG. 4 is a partially-enlarged cross-sectional side view showing that a transmission component 30 of the transmission mechanism 1 is in a releasing position.

In this embodiment, transmission mechanism 1 may include an actuating component 10, at least one first engagement structure 21, at least one second engagement structure 22, at least one transmission component 30, at least one third engagement structure 31, at least one fourth engagement structure 32, and at least one electromagnet 40. In addition, there may be at least one driving unit 8 disposed on the casing 90, the driving unit 8 is configured to cause the transmission mechanism 1 to move. In this embodiment that the casing assembly 9 includes a plurality of driven components 91, the transmission mechanism 1 includes the first engagement structures 21, the second engagement structures 22, the transmission components 30, the third engagement structures 31, the fourth engagement structures 32, and the electromagnets 40 which are in the same number as the driven components 91. Note that the numbers of the numbers of the driven components 91, the first engagement structures 21, the second engagement structures 22, the transmission components 30, the third engagement structures 31, the fourth engagement structures 32, and the electromagnets 40 are exemplary and may be modified as required. In some other embodiments, there may be only one second engagement structure, one transmission component, one third engagement structure, one fourth engagement structure, and one electromagnet in the transmission mechanism.

The actuating component 10 may be rotatably disposed on the casing 90 about an axis AX. The actuating component 10 may have a transmission portion 83 thereon. The transmission portion 83 may be a gear. Any suitable motor may be employed as the driving unit 8. The transmission portion 83 may be meshed with an output shaft 81 of the driving unit 8. The driving unit 8 is able to rotate the actuating component 10 in direction indicated by arrow A or opposite direction indicated by arrow A' by driving the transmission portion 83. In some embodiments, the transmission portion 83 may be sleeved on the actuating component 10; in some other embodiments, the transmission portion 83 may be integrally formed with the actuating component 10.

In this embodiment, the actuating component 10 may be disposed through all of the driven components 91 and therefore can be served as a shaft for the driven components 91; in other words, the driven components 91 may be co-axially disposed on the casing 90 via the actuating component 10. As shown, each of the driven components 91 may have an inner surface 910 and a first through hole 911 which is defined by the inner surface 910. The actuating component 10 is disposed through the first through holes 911 of the driven component 91.

The transmission component 30 may be sleeved on the actuating component 10 and located in the first through hole 911 of the driven component 91. As shown, the transmission component 30 may have an inner surface 300 and a second shaft hole 301 defined by the inner surface 300, the actuating component 10 may be disposed through the second shaft hole 301 of the transmission component 30. The transmission component 30 is movable relative to the actuating component 10 and therefore have a releasing position (e.g., see FIG. 3 or FIG. 4) and an engaged position (e.g., see FIG. 5). Specifically, the transmission component 30 is slidable along the axis AX and therefore is selectively movable to the releasing position or the engaged position.

The first engagement structure 21 may be located on an outer surface 11 of the actuating component 10 and located in the second shaft hole 301 of the transmission component 30; specifically, the first engagement structure 21 may be integrally formed on or an annually-shaped protrusion additionally fixed on the outer surface 11 of the actuating component 10. For example, in some embodiments, the first engagement structure 21 may be any suitable external gear disposed on the outer surface 11 of the actuating component 10.

The second engagement structure 22 may be located on the inner surface 910 of the first through hole 911 of the driven component 91; specifically, the second engagement structure 22 may be integrally formed on or an annually-shaped protrusion additionally fixed on the inner surface 910 of the driven component 91. For example, in some embodiments, the second engagement structure 22 may be any suitable internal gear disposed on the inner surface 910 of the driven component 91.

The third engagement structure 31 may be located on an inner surface 300 of the second shaft hole 301 of the transmission component 30; specifically, the third engagement structure 31 may be integrally formed on or an annually-shaped protrusion additionally fixed on the inner surface 300 of the transmission component 30. For example, in some embodiments, the third engagement structure 31 may be any suitable internal gear disposed on the inner surface 300 of the transmission component 30. The fourth engagement structure 32 may be located on an outer surface 303 of the transmission component 30; specifically, the fourth engagement structure 32 may be integrally formed on or an annually-shaped protrusion additionally fixed on the outer surface 303 of the transmission component 30. For example, in some embodiments, fourth engagement structure 32 may be any suitable external gear disposed on the outer surface 303 of the transmission component 30.

The third engagement structure 31 is selectively engaged with the first engagement structure 21, and the fourth engagement structure 32 is selectively engaged with the second engagement structure 22, such that the transmission component 30 is able to be engaged between the actuating component 10 and the driven component 91. Note that any suitable toothed structure or shaped contour may be employed as the first engagement structure, the second engagement structure, the third engagement structure, and the fourth engagement structure. In some other embodiments, the first engagement structure may have a contour in triangular, rectangular, or another shape, the third engagement structure may have a contour mating the first engagement structure, the fourth engagement structure may have a contour in triangular, rectangular, or another shape, and the second engagement structure may have a contour mating the fourth engagement structure.

The electromagnet 40 is a type of magnet in which the magnetic field is produced by an electric current provided by any suitable means that is electrically connected to the electromagnet 40. Specifically, an electromagnet 40 is able to receive an electric current provided from any suitable cable (not shown) which is controlled by a control center (not shown). As such, the user is allowed to provide electric current to one or more selected electromagnets 40 through the control center. In this embodiment, the electromagnet 40 may be located in the first through hole 911 of the driven component 91 and arranged at a side of the transmission component 30. For example, the electromagnet 40 may have a third shaft hole 401, the actuating component 10 may be disposed through the third shaft hole 401 of the electromagnet 40; in other words, the electromagnet 40 may be sleeved on the actuating component 10. A magnetic attraction is produced between the electromagnet 40 and the transmission component 30 when an electric current is provided to the electromagnet 40. Specifically, at least a portion of the transmission component 30 that is located adjacent to the electromagnet 40 is made of a material which can be attracted to the electromagnet 40. Thus, selectively, when the electromagnet 40 receives an electric current to produce a magnetic field, the electromagnet 40 attracts the transmission component 30 so that the transmission component 30 is forced to move towards the electromagnet 40 along the axis AX, thereby causing the transmission component 30 to switch to the engaged position.

In addition, the transmission mechanism 1 may further include an elastic component 50 and a stopping structure 60. The stopping structure 60 may be a protrusion formed on the inner surface 910 of the driven component 91, the elastic component 50 may be any suitable compression spring, the elastic component 50 may be sleeved on the transmission component 30, two opposite ends of the elastic component 50 may respectively in direct contact with a stopping surface 302 of the transmission component 30 and the stopping structure 60, thus the elastic component 50 is able to cause the transmission component 30 to move back to the releasing position; in other words, the elastic component 50 is able to cause the third engagement structure 31 and the fourth engagement structure 32 to respectively disengage from the first engagement structure 21 and the second engagement structure 22.

Then, the operation of the transmission mechanism 1 is described below with reference to FIGS. 1A and 2-4 and further reference to FIG. 5. Firstly, please see FIGS. 3-4, when no electric current is provided to the electromagnet 40, the elastic component 50 pushes the stopping surface 302 of the transmission component 30 and thereby keeping the transmission component 30 in the releasing position which is located away from the electromagnet 40. When the transmission component 30 is in the releasing position, the third engagement structure 31 of the transmission component 30 and the first engagement structure 21 of the actuating component 10 are separated from each other, and the fourth engagement structure 32 of the transmission component 30 and the second engagement structure 22 of the driven component 91 are separated from each other.

When the transmission component 30 is the releasing position, the transmission component 30 is slidable along and rotatable about the axis AX relative to the actuating component 10 and the driven component 91, and the actuating component 10 is free to rotate relative to the transmission component 30 and the driven component 91 by being driven by the driving unit 8. In other words, when the transmission component 30 is in the releasing position, the rotation movement of the actuating component 10 does not affect the transmission component 30 and the driven component 91; that is, when the transmission component 30 is in the releasing position, the actuating component 10 is in an idling status that does not move the driven component 91.

Figure 5:
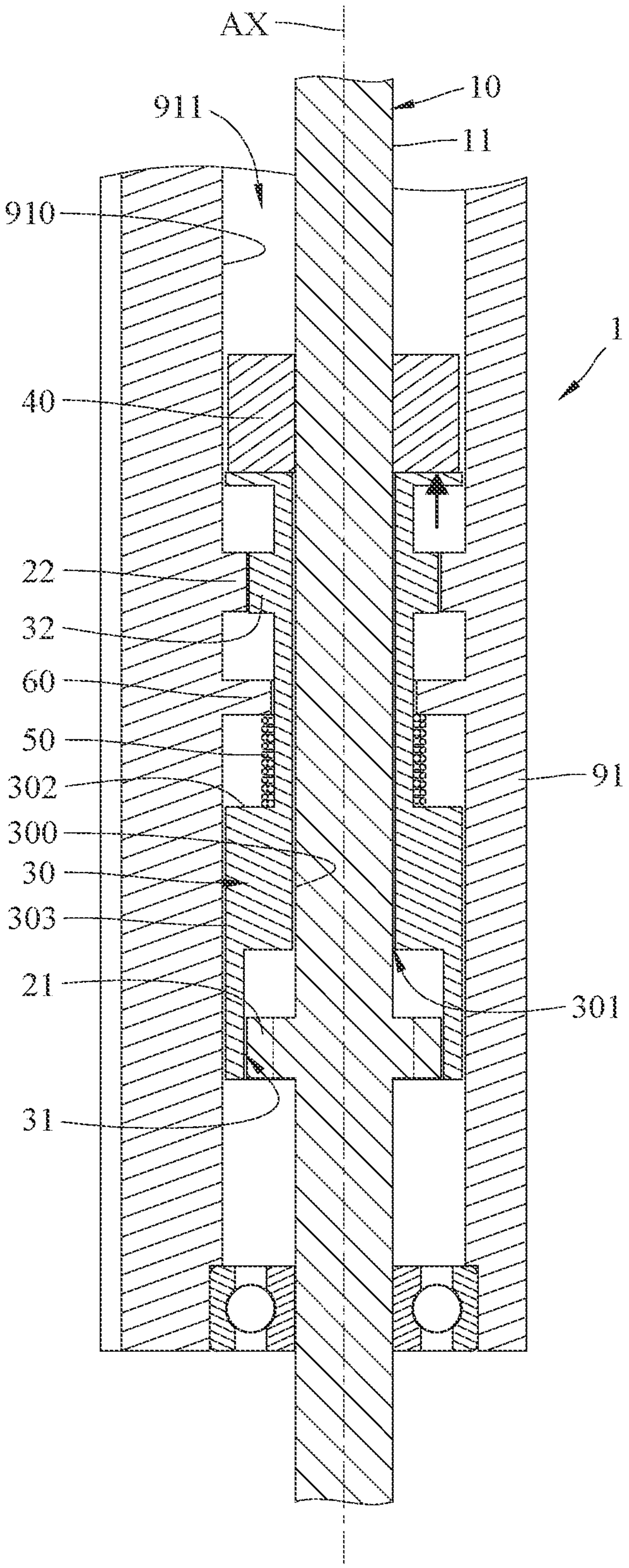
FIG. 5 is a partially-enlarged cross-sectional side view showing that the transmission component of the transmission mechanism is in an engaged position.

Then, in FIG. 5, when an electric current is provided to the electromagnet 40, the magnetic attraction force produced between the electromagnet 40 and the transmission component 30 can cause the transmission component 30 to move towards the electromagnet along the axis AX so as to switch the transmission component 30 from the releasing position to the engaged position. When the transmission component 30 is in the engaged position, the third engagement structure 31 of the transmission component 30 is engaged with the first engagement structure 21 of the actuating component 10 and the fourth engagement structure 32 of the transmission component 30 is engaged with the second engagement structure 22 on the driven component 91, such that the driving unit 8 is currently able to force the actuating component 10 to rotate the transmission component 30 through the engagement between the first engagement structure 21 and the third engagement structure 31, and the transmission component 30 being rotated by the actuating component 10 is currently able to force the driven component 91 to rotate through the engagement between the fourth engagement structure 32 and the second engagement structure 22. Accordingly, through the transmission component 30, the actuating component 10 is able to cause the driven component 91 to simultaneously rotate in direction indicated by arrow A or opposite direction indicated by arrow A', such that the driven component 91 can be opened or closed as required.

Referring back to FIGS. 1A and 1B, by providing electric current to one or more selected electromagnets 40, the respective driven components 91 are therefore opened or closed, enabling a convenient placement of user's possessions into the selected accommodation space S of the casing 90.

Figure 6:
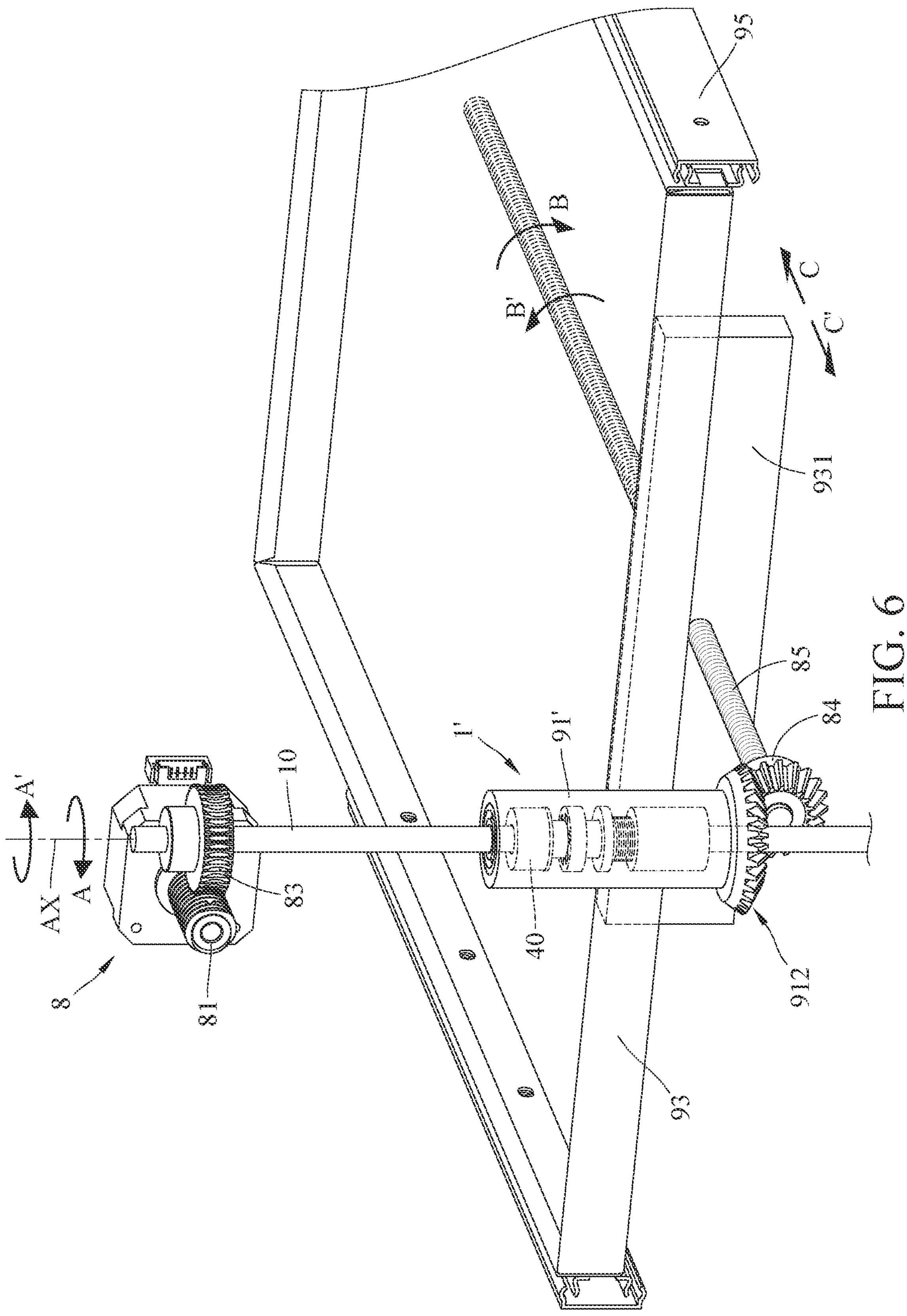
FIG. 6 is a partially-enlarged view of another area of FIG. 1.
Figure 7:
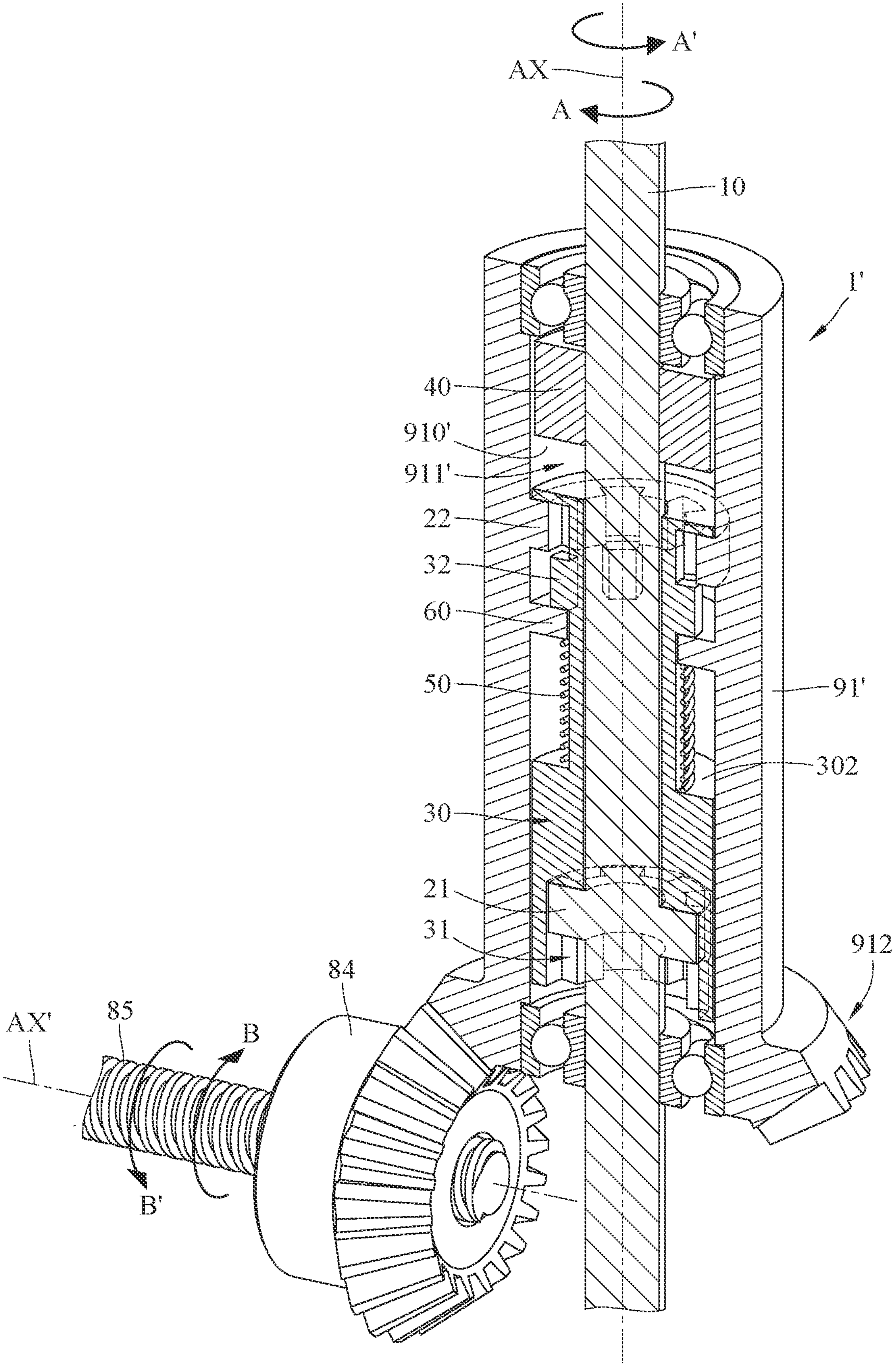
FIG. 7 is a partially-enlarged cross-sectional perspective view of FIG. 6.
Figure 8:
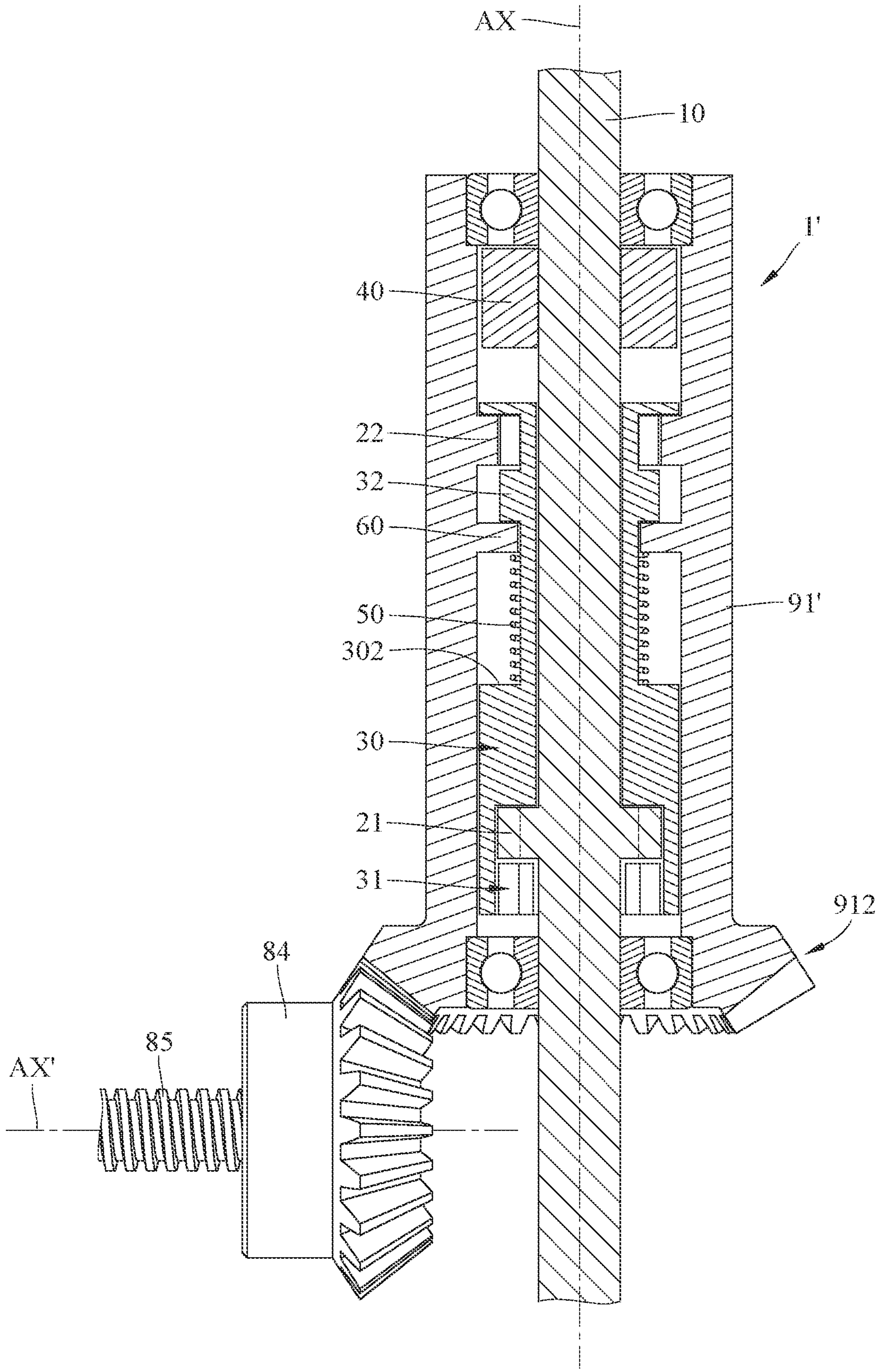
FIG. 8 is a partially-enlarged cross-sectional side view showing that a transmission component of a transmission mechanism is in a releasing position.

Then, the details of the transmission mechanism 1' are provided below with reference to FIGS. 6-8, where FIG. 6 is a partially-enlarged view of the transmission mechanism 1', FIG. 7 is a partially-enlarged cross-sectional perspective view of the transmission mechanism 1', and FIG. 8 is a partially-enlarged cross-sectional side view showing that the transmission component 30 of the transmission mechanism 1' is in the releasing position. For the purpose of simplicity, only the differences between the transmission mechanism 1' and the transmission mechanism 1 will be described in detail below. It is also noted that the same reference numerals in different figures denote the same elements.

In the transmission mechanism 1', the driven component 91' may be a hollow cylinder. There may be a transmission portion 912 located at an end of the driven component 91'. The transmission portion 912 may be a bevel gear and configured to be meshed with the transmission gear 84. The actuating component 10 of the transmission mechanism 1' may be disposed through all of the driven components 91' and therefore can be served as a shaft for the driven components 91'; in other words, the driven components 91' may be co-axially disposed on the casing 90 via the actuating component 10. As shown, each of the driven components 91' may have a first through hole 911'. The actuating component 10 is disposed through the first through holes 911' of the driven component 91'.

In the transmission mechanism 1', the transmission component 30 may be sleeved on the actuating component 10 and located in the first through hole 911' of the driven component 91'. The second engagement structure 22 may be any suitable internal gear integrally formed on or additionally fixed on an inner surface 910' which defines the first through hole 911' of the driven component 91'. The electromagnet 40 may be sleeved on the actuating component 10 and located in the first through hole 911' of the driven component 91'. The stopping structure 60 may be a protrusion formed on the inner surface 910' of the driven component 91'.

Then, the operation of the transmission mechanism 1' is described below with reference to FIGS. 1A and 6-8 and further reference to FIG. 9. Firstly, please see FIGS. 7-8, when no electric current is provided to the electromagnet 40 of the transmission mechanism 1', the elastic component 50 pushes the stopping surface 302 of the transmission component and thereby keeping the transmission component 30 in the releasing position which is located away from the electromagnet 40. When the transmission component 30 is in the releasing position, the third engagement structure 31 of the transmission component 30 and the first engagement structure 21 of the actuating component 10 are separated from each other, and the fourth engagement structure 32 of the transmission component 30 and the second engagement structure 22 of the driven component 91' are separated from each other.

Also, in the transmission mechanism 1', when the transmission component 30 is the releasing position, the transmission component 30 is slidable along and rotatable about the axis AX relative to the actuating component 10 and the driven component 91', and the actuating component 10 is free to rotate relative to the transmission component 30 and the driven component 91' by being driven by the driving unit 8. In other words, when the transmission component 30 is in the releasing position, the rotation movement of the actuating component 10 does not affect the transmission component 30 and the driven component 91'; that is, when the transmission component 30 is in the releasing position, the actuating component 10 is in an idling status that does not move the driven component 91'.

Figure 9:
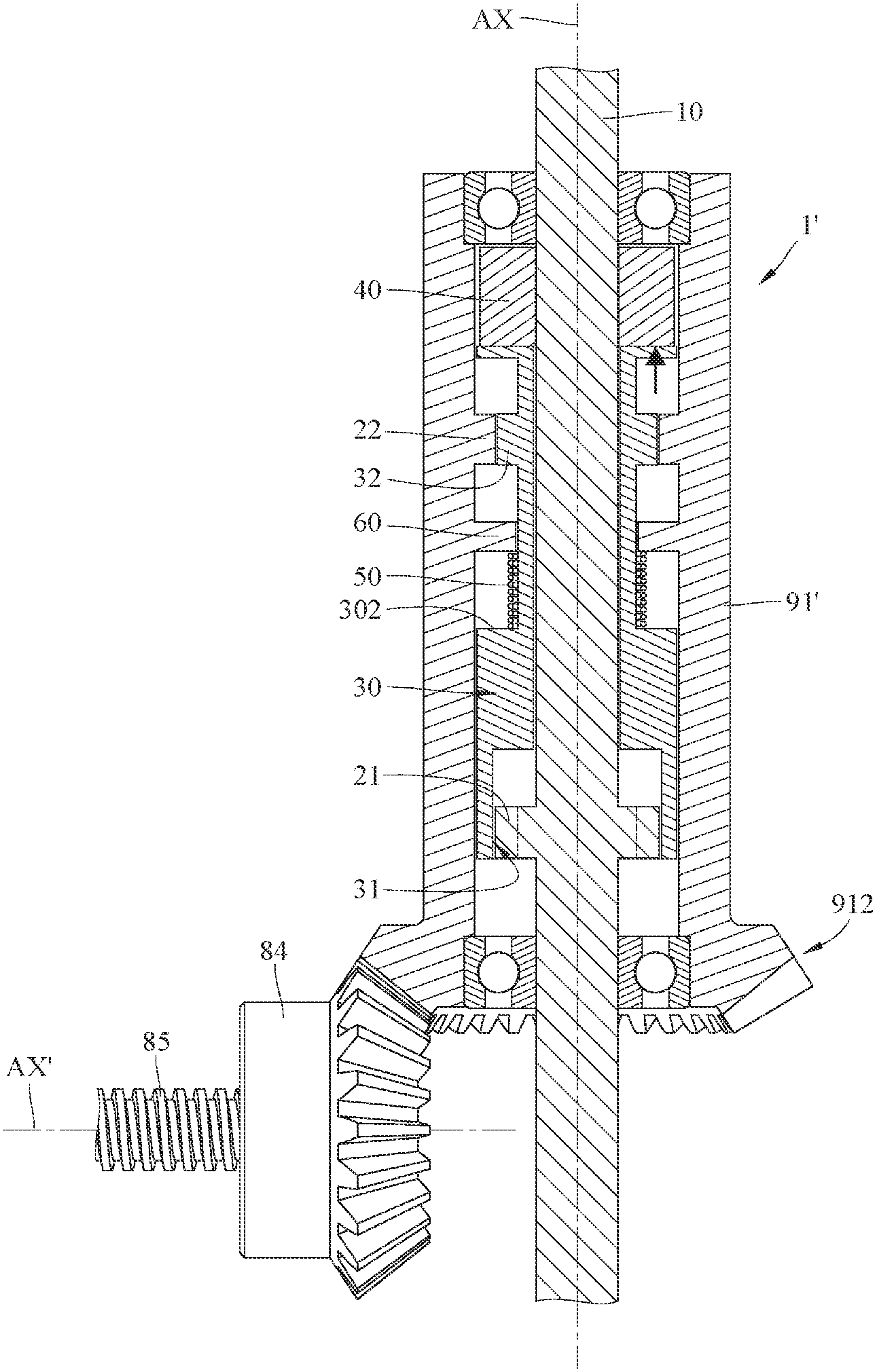
FIG. 9 is a partially-enlarged cross-sectional side view showing that the transmission component of the transmission mechanism is in an engaged position.

Then, in FIG. 9, when an electric current is provided to the electromagnet 40, the magnetic attraction force produced between the electromagnet 40 and the transmission component 30 can cause the transmission component 30 to move towards the electromagnet along the axis AX so as to switch the transmission component 30 from the releasing position to the engaged position. When the transmission component 30 is in the engaged position, the third engagement structure 31 of the transmission component 30 is engaged with the first engagement structure 21 of the actuating component 10 and the fourth engagement structure 32 of the transmission component 30 is engaged with the second engagement structure 22 on the driven component 91', such that the driving unit 8 is currently able to force the actuating component 10 to rotate the transmission component 30 through the engagement between the first engagement structure 21 and the third engagement structure 31, and the transmission component 30 being rotated by the actuating component 10 is currently able to force the driven component 91' to rotate through the engagement between the fourth engagement structure 32 and the second engagement structure 22.

Accordingly, through the transmission component 30 in the transmission mechanism 1', the actuating component 10 is able to cause the driven component 91' to simultaneously rotate in direction indicated by arrow A or opposite direction indicated by arrow A', such that the transmission portion 912 of the driven component 91' is able to cause the transmission gear 84 and the transmission rod 85 to simultaneously rotate in direction indicated by arrow B or opposite direction indicated by arrow B', thereby causing the supporting component 93 to simultaneously slide in direction indicated by arrow C or opposite direction indicated by arrow C'.

Referring back to FIGS. 1A and 1B, by providing electric current to one or more selected electromagnets 40 in the transmission mechanism 1', the respective driven components 91 are therefore rotated to cause the selected supporting components 93 to slide, enabling a convenient placement of user's possessions on the selected supporting components 93 of the casing 90.

Note that the casing assembly may only adopt the transmission mechanism 1 or the transmission mechanism 1'. In some other embodiments, the casing assembly may omit the aforementioned transmission mechanism 1' while including the transmission mechanism 1; in another embodiment, the casing assembly may omit the aforementioned transmission mechanism 1 while including the transmission mechanism 1'.

According to the transmission mechanisms and the casing assemblies as discussed in the above embodiments of the disclosure, the transmission component is selectively attracted to the electromagnet, thus the actuating component being disposed through the transmission component is able to move the driven component via the transmission component. Such an arrangement makes the transmission mechanism possible to be incorporated with automatic control system and thereby allowing user to selectively instruct the actuating component to move any selected driven component, realizing automatic operation of driven component and improving convenience in operating the driven component.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A transmission mechanism in combination with a driven component comprising a first through hole, the transmission mechanism comprising:

an actuating component rotatably disposed through the first through hole of the driven component;

a transmission component located in the first through hole, the actuating component being disposed through the transmission component; and an electromagnet located in the first through hole and arranged at a side of the transmission component, the transmission component being selectively attracted to the electromagnet;

wherein the driven component is rotated by the transmission component when the transmission component is attracted to the electromagnet, and the transmission component is driven by the actuating component.

2. The transmission mechanism in combination with the driven component according to claim 1, further comprising a first engagement structure, a second engagement structure, a third engagement structure, and a fourth engagement structure, wherein the first engagement structure is located at an outer surface of the actuating component, the second engagement structure is located at an inner surface of the first through hole of the driven component, the third engagement structure is fixed to an inner surface of the transmission component and corresponding to the first engagement structure, the fourth engagement structure is fixed to an outer surface of the transmission component and corresponding to the second engagement structure, the transmission component is attracted to the electromagnet selectively, and the third engagement structure and the fourth engagement structure are moved and respectively engaged with the first engagement structure and the second engagement structure when the transmission component is attracted to the electromagnet.

3. The transmission mechanism in combination with the driven component according to claim 2, wherein the first engagement structure is an external gear, the third engagement structure is an internal gear, the second engagement structure is an internal gear, and the fourth engagement structure is an external gear.

4. The transmission mechanism in combination with the driven component according to claim 2, further comprising a stopping structure and an elastic component, the stopping structure protrudes from the inner surface of the first through hole of the driven component, the elastic component is sleeved on the transmission component, two opposite ends of the elastic component are in contact with a stopping surface of the transmission component and the stopping structure, respectively, and the third engagement structure and the fourth engagement structure are respectively disengaged from the first engagement structure and the second engagement structure by the elastic component.

5. The transmission mechanism in combination with the driven component according to claim 4, wherein the elastic component is a spring.

6. The transmission mechanism in combination with the driven component according to claim 1, further comprising a driving unit, wherein the actuating component is rotatable by the driving unit.

7. The transmission mechanism in combination with the driven component according to claim 1, wherein the electromagnet is sleeved on the actuating component.

8. The transmission mechanism in combination with the driven component according to claim 2, wherein the transmission component is movable between a releasing position and an engaged position, when the transmission component is in the releasing position, the third engagement structure and the first engagement structure are separated from each other, and the fourth engagement structure and the second engagement structure are separated from each other; when the transmission component is in the engaged position, the third engagement structure and the fourth engagement structure are engaged with the first engagement structure and the second engagement structure, respectively.

9. A casing assembly, comprising:
a casing;
a transmission mechanism disposed on the casing; and
a driven component disposed on the casing and having a first through hole;
wherein the transmission mechanism comprising:
an actuating component rotatably disposed through the first through hole of the driven component;
a transmission component located in the first through hole of the driven component, the actuating component being disposed through the transmission component; and
an electromagnet located in the first through hole of the driven component and arranged at a side of the transmission component, the transmission component being selectively attracted to the electromagnet;
wherein the driven component is rotated by the transmission component when the transmission component is attracted to the electromagnet, and the transmission component is driven by the actuating component.

10. The casing assembly according to claim 9, wherein the transmission mechanism further comprises a first engagement structure, a second engagement structure, a third engagement structure, and a fourth engagement structure, the first engagement structure is located at an outer surface of the actuating component, the second engagement structure is located at an inner surface of the first through hole of the driven component, the third engagement structure is fixed to an inner surface of the transmission component and corresponding to the first engagement structure, the fourth engagement structure is fixed to an outer surface of the transmission component and corresponding to the second engagement structure, the transmission component is attracted to the electromagnet selectively, and the third engagement structure and the fourth engagement structure are moved and respectively engaged with the first engagement structure and the second engagement structure when the transmission component is attracted to the electromagnet.

11. The casing assembly according to claim 10, wherein the first engagement structure is an external gear, the third engagement structure is an internal gear, the second engagement structure is an internal gear, and the fourth engagement structure is an external gear.

12. The casing assembly according to claim 10, wherein the transmission mechanism further comprises a stopping structure and an elastic component, the stopping structure protrudes from the inner surface of the first through hole of the driven component, the elastic component is sleeved on the transmission component, two opposite ends of the elastic component are in contact with a stopping surface of the transmission component and the stopping structure, respectively, and the third engagement structure and the fourth engagement structure are respectively disengaged from the first engagement structure and the second engagement structure by the elastic component.

13. The casing assembly according to claim 12, wherein the elastic component is a spring.

14. The casing assembly according to claim 9, wherein the transmission mechanism further comprises a driving unit, wherein the actuating component is rotatable by the driving unit.

15. The casing assembly according to claim 9, wherein the electromagnet is sleeved on the actuating component.

16. The casing assembly according to claim 10, wherein the transmission component is movable between a releasing position and an engaged position, when the transmission component is in the releasing position, the third engagement structure and the first engagement structure are separated from each other, and the fourth engagement structure and the second engagement structure are separated from each other; when the transmission component is in the engaged position, the third engagement structure and the fourth engagement structure are engaged with the first engagement structure and the second engagement structure, respectively.

17. The casing assembly according to claim 9, further comprising a transmission rod and a transmission gear disposed on the transmission rod and meshed with a transmission portion of the driven component.

18. The casing assembly according to claim 17, wherein the transmission portion is a bevel gear, the transmission rod is a screw rod and at a right angle to the actuating component.

19. The casing assembly according to claim 18, further comprising a supporting component slidably disposed on the casing, wherein the transmission rod is meshed with a connection structure of the supporting component, the supporting component is selectively moved by the driven component via the transmission gear and the transmission rod.

20. A casing assembly, comprising:
a casing;
a transmission mechanism disposed on the casing; and
a plurality of driven components disposed on the casing via the transmission mechanism, wherein the plurality of driven components each has a first through hole;
wherein the transmission mechanism comprising:
an actuating component rotatably disposed through the first through holes of the plurality of driven components;
a plurality of transmission components respectively located in the first through holes of the plurality of driven components, wherein the actuating component is disposed through the plurality of transmission components;
a driving unit, the actuating component being rotated via the driving unit; and
a plurality of electromagnets respectively located in the first through holes of the plurality of driven components and respectively arranged at sides of the plurality of transmission components, the plurality of transmission components being selectively attracted to the plurality of electromagnets, respectively;
wherein at least one of the plurality of driven components is rotated by at least one of the plurality of the transmission components when the at least one of the plurality of transmission components is attracted to at least one of the plurality of electromagnets, and the at least one of plurality of transmission components is driven by the actuating component.

* * * * *